United States Patent [19]

Kim et al.

[11] Patent Number: 5,476,909
[45] Date of Patent: Dec. 19, 1995

[54] BIODEGRADABLE COPOLYMER FOR MEDICAL APPLICATION

[75] Inventors: Gun P. Kim; Jin D. Song, both of Taejeon, Rep. of Korea

[73] Assignee: Sam Yang Co., Ltd., Seoul, Rep. of Korea

[21] Appl. No.: 192,904

[22] Filed: Feb. 7, 1994

[30] Foreign Application Priority Data

Mar. 16, 1993 [KR] Rep. of Korea ............... 93-4020

[51] Int. Cl.$^6$ ............... C08G 65/08; C08G 63/08; C08G 63/672; C08G 63/60
[52] U.S. Cl. ............... 525/408; 525/411; 525/413; 528/301; 528/354
[58] Field of Search ............... 525/408, 411, 525/413; 528/301, 354

[56] References Cited

U.S. PATENT DOCUMENTS

| | | | |
|---|---|---|---|
| 4,452,973 | 6/1984 | Casey | 525/408 |
| 4,716,203 | 12/1987 | Casey et al. | 525/408 |
| 4,942,035 | 7/1990 | Churchill et al. | 424/423 |

FOREIGN PATENT DOCUMENTS

| | | | |
|---|---|---|---|
| 89038 | 9/1983 | European Pat. Off. | 525/408 |

OTHER PUBLICATIONS

"Grant & Hackh's Chemical Dictionary" p. 461, 5th Edition.
Journal Of Polymer Science: Part A: Polymer Chemistry, vol. 27, 2151–2159 (1989), K. J. Zhu et al.: *Super Microcapsules (SMC). I. Preparation and Characterization of Star Polyethylene Oxide (PEO)–Polylactide (PLA) Copolymers.*
Journal Of Applied Polymer Science, vol. 39, 1–9 (1990), K. J. Zhu et al.: *Preparation, Characterization, and Properties of Polylactide (PLA)–Poly(ethylene Glycol) (PEG) Copolymers: A Potential Drug Carrier.*

Primary Examiner—David Buttner
Attorney, Agent, or Firm—Kenyon & Kenyon

[57] ABSTRACT

The present invention relates to a triblock(ABA) copolymer used for medical application essentially consisting of: PLA, PGA, or PLA/PGA as hydrophobic block(A), biodegradable PEO derivatives synthesized by PEOs less than 4,000 molecular weight by the ester linkage among them as hydrophilic block (B). The present invention also provides a triblock copolymer easily degradable to the compounds less than M.W. 4,000 in order to excrete through the human kidney, which enables its medical application. Furthermore, using the triblock copolymer of the present invention, the improved hydrogel materials with broad biochemical applications can be provided due to its biodegradable and thermoplastic properties.

6 Claims, No Drawings

BIODEGRADABLE COPOLYMER FOR MEDICAL APPLICATION

BACKGROUND OF THE INVENTION

1. Field of the Invention

The present invention relates to a novel thermoplastic, biodegradable hydrogel copolymers. More specifically, this invention concerns the bioabsorbable copolymers used for medical applications according to the biodegradable property of polyethyleneoxide(PEO) in a block copolymer essentially consisting of PEO, polylactide(PLA) and polyglycolide(PGA).

2. Description of the Prior Art

Recently, hydrogels have been used widely in a variety of biochemical applications, for example, contact lenses, burn dressings, implants, lubricant coatings and drug delivery devices.

In some of these areas, crosslinked hydrogel materials have met with great success. However, these materials suffer drawbacks, such as a lack of processibility as a consequence of their cross-linked nature.

To minimize these problems, the use of block copolymer having thermoplastic and biodegradable properties has been researched. Particularly, the research focused to ABA type triblock copolymer has proceeded positively.

An ABA triblock copolymer, the middle block(B) as polyethyleneoxide having a hydrophilic property and the end blocks(A) as polylactide, polyglycolide or their copolymer having hydrophobic and biodegradable properties, was reported by J. of Bio. Mat. Res. Vol 21, 1301(1987) and J. of poly. Sci. Part A, *Polymer Chemistry*, Vol. 27, 2151(1989). Other block copolymers synthesized by hydrophilic and hydrophobic polymers were disclosed by U.S. Pat. Nos. 4,942,035 and 4,716,203. Among these block copolymers, polylactide has been chiefly used as hydrophobic polymer and polyethyleneoxide has been generally used as hydrophilic polymer due to its safety to the human body.

The above mentioned patents disclosed the triblock copolymers as a shape of PLA/PEO/PLA, in which PEO shows hydrophilic property and PLA shows hydrophobic property. Furthermore, the molecular weight of PEO in these patents has to be more than 8,000, particularly, PEO M.W. 8,000, PEO M.W. 14,000 and PEO M.W. 20,000, in order to sustain the hydrophilic property of whole triblock copolymer.

However, the PEO more than M.W. 4,000 is very hard to use for medical application, since it hardly excretes through the human kidney.

SUMMARY OF THE INVENTION

The object of the present invention is to provide a triblock(ABA) copolymer used for medical application essentially consisting of: PLA, PGA, or PLA/PGA as hydrophobic block(A), biodegradable PEO derivatives synthesized from PEOs of less than 4,000 molecular weight by an ester linkage between them as hydrophilic block (B).

A further object of the present invention is to provide a triblock copolymer easily degraded to the compounds less than M.W. 4,000 in order to excrete through the human kidney, which enables its medical application. Furthermore, using the triblock copolymer of the present invention, improved hydrogel materials with broad biochemical applications can be provided due to its biodegradable and thermoplastic properties.

DETAILED DESCRIPTION OF THE INVENTION

Triblock copolymers of the present invention can be shown by following formulas(I)a, (I)b and(I)c.

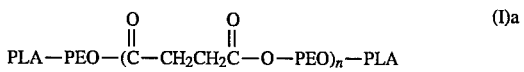

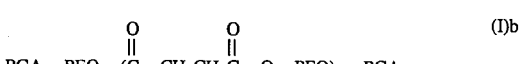

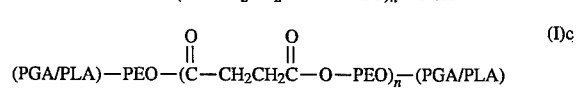

wherein n shows the integer 1 to 9.

The preparation of triblock copolymer of the present invention can be explained as follows.

To obtain the triblock copolymer, polyethyleneoxide derivative in the middle block has to be prepared at the first step.

The polyethyleneoxide(PEO) less than M.W. 4,000 is reacted with excess succinic acid, in the presence of triethylamine and dimethylaminopyridine(DMAP) as catalyst in dichloromethane solvent in order to obtain acid-form PEO derivative. By adding PEO to this acid-form PEO derivative, three-chained polyethyleneoxide derivative is prepared as the result of esterification reaction among them.

By repeating the same reactions, an odd number, such as five(5), seven (7) or nine (9), of multi-chained PEO derivatives can be prepared.

To obtain the double-chained PEO derivatives, PEO is reacted with 0.5 mole fraction of succinic acid, in the presence of DMAP and triethylamine as catalyst. By repeating the same reactions, the even number of multi-chained PEO derivatives can be prepared.

However, the multi-chained PEO derivatives more than 10 chains are hard to obtain from these reactions, since the yield of these reactions diminishes by repeating the reactions.

PEO derivatives synthesized by these reactions are easily degraded into the PEOs less than M.W. 4,000 in the human body by the hydrolysis of the ester bonds. Therefore, PEO derivatives of the present invention can be easily excreted through the human kidney without storing in the human body.

On the other hand, the PEOs less than M.W. 600 can hardly be used for these reactions, since too many reactions are required to sustain the hydrophilic property of triblock copolymer. Therefore, the PEOs M.W. 600 to M.W. 4,000 are required to be used as raw materials of this invention.

At the second step, the obtained multi-chained PEO derivatives have to be polymerized with lactide(or glycolide) in order to have both hydrophilic and hydrophobic properties. The following are detailed steps of polymerization.

Obtained multi-chained PEO derivatives are mixed with lactide (or glycolide)using the tin (II) as catalyst, and the mixtures are reacted for 3 hours at 160°–180° C. Reacted mixtures are washed with acetone-water (1:1 V/V) and extracted with ethylacetate-normal hexane(2:1 V/V). Final copolymer can be obtained after drying the mixture for three (3) days in a vacuum oven.

The quantity of lactide or glycolide used for polymerization plays the important role for phase-transition in the mixed aqueous solution. To obtain the useful copolymer, it is required to sustain the weight of PEO derivative in ten (10) to ninety (90) percent (W/W) of obtained copolymer.

The present invention can be explained more specifically by, but is not limited to, the following examples.

Example 1

1 mole of polyethylenoxide (PEO) made by Aldrich Chemical Co. in the United States, 2 moles of succinic anhydride, 2 moles of triethylamine and 2 moles of dimethylaminopyridine are mixed and dissolved in dichloromethane solvent, and are reacted for three(3) hours in room temperature.

The obtained material is dissolved in dichloromethane-ether(1:1 V/V) solution and insoluble material is removed. The white powder of PEO derivative is obtained after drying the solvent. The yield of this reaction is about ninety(90) percent.

Example 2

1 mole of PEO derivative obtained in example 1, 2 moles of PEO, 2 moles of dicyclohexacarbonylimide and 2 moles of dimethylaminopyridine are mixed and dissolved in dichloromethane solvent, and reacted. The obtained material is dried in the same way as in example 1, three-chained PEO derivative is obtained.

Example 3

The hydroxyl group in both ends of obtained PEO derivative in example 2 is converted into carboxyl acid by the same way as in example 1. By adding the two PEOs to this material, five-chained PEO derivative is obtained.

Example 4

1 mole of polyethyleneoxide, 0.5 mole of succinic acid, 0.5 mole of triethylamine and 0.5 mole of dimethylaminopyridine are mixed and reacted in dichloromethane solvent. After purification, double-chained PEO derivative is obtained.

Example 5

Four(4) chained PEO derivative is obtained by repeating the method of example 1 and 2 to the obtained PEO derivative of example 4.

Example 6

Lactide(or glycolide) is added to the compounds made by example 1 to example 5 at 130° C. in a vacuum condition(less than 0. 1 mmHg) under nitrogen atmosphere, and the mixture is stirred until solid material is dissolved completely.

After increasing the temperature up to 170° C., 0.03 weight percent of organic tin (II) to the lactide(or glycolide) is added as catalyst, and the mixture is reacted for three(3) hours. After the increase of viscosity, reacted material is cooled and dissolved in acetone. The reacted material is precipitated after adding excessive ethanol, and the precipitate is filtered and dried for a day in room temperature.

The composition, number average molecular weight and thermoproperties of the obtained copolymers are shown in TABLE 1.

TABLE 1

| (M.W. of PEO/ No. of PEO chains) Nos. | mole percent of each monomer in the copolymer | | | number average molecular weight (× 10⁴) | Tg * | Tm ** |
|---|---|---|---|---|---|---|
| | LA | GA | EO | | | |
| 1 (3400/3) | 60 | — | 40 | 1.5 | 10 | 120 |
| 2 (3400/3) | 75 | — | 25 | 3.5 | 13 | 120 |
| 3 (3400/5) | 28 | — | 72 | 2.3 | 10 | 46 |
| 4 (3400/5) | 65 | — | 35 | 4.3 | 12 | 120 |
| 5 (2000/3) | 76 | — | 24 | 2.2 | 10 | 125 |
| 6 (1500/3) | 86 | — | 14 | 2.8 | 6 | 136 |
| 7 (1500/5) | 48 | — | 52 | 1.3 | 8 | — |
| 8 (3400/3) | — | 30 | 70 | .1.6 | — | 50 |
| 9 (3400/5) | — | 34 | 66 | 2.7 | — | 51 |
| 10 (2000/3) | — | 42 | 58 | 1.2 | — | — |
| 11 (1500/5) | — | 64 | 36 | 2.5 | 20 | 180 |
| 12 (2000/3) | 12 | 48 | 40 | 2.0 | 18 | — |
| 13 (1500/3) | 53 | 13 | 34 | 1.7 | 8 | — |

*Tg: Glass transition temperature of PLA or PGA chain. This value is measured by increasing the temperature at the rate of 10° C. in the range of −70° C. to 250°C., using the thermoanalyzer: Perkin-Elmer DSC 4 770.
**Tm: Melting temperature of PLA, PGA or PEO chain

Example 7

For researching the degradability of obtained copolymers, the small samples(1 cm ×0.2 cm×0.2 cm) are collected and dissolved in 37° C. water. All samples are dissolved in water within one month.

The degradability of these samples is twice as good as that of copolymer using normal PEO, because multi-chained PEO derivatives are easily degradable. Half of Ester bonds in multi-chained PEO derivatives are hydrolyzed after a lapse of ten(10) days.

This means that triblock copolymer having multi-chained PEO block shows better degradability than the block copolymer having single-chained PEO block.

We claim:

1. A biodegradable triblock (ABA) copolymer for medical applications essentially consisting of:
   i) end blocks (A) comprising polylactide (PLA), polyglycolide (PGA) or PLA/PGA copolymer,
   ii) a middle block (B) comprising biodegradable polyethyleneoxide (PEO) derivatives synthesized from PEOs of less than 4,000 molecular weight connected by an ester linkage, as shown in following formulas (I)a, (I)b and (I)c;

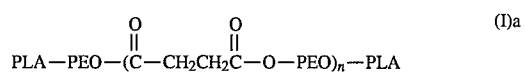

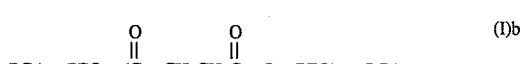

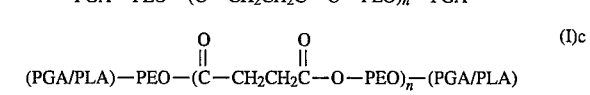

wherein n is an integer from 1 to 9.

2. A biodegradable triblock copolymer according to claim 1, wherein the weight of PEO derivatives lies between ten (10) and ninety (90) percent (W/W) of triblock copolymer.

3. A biodegradable triblock copolymer according to claim 1, wherein the molecular weight of each PEO lies between six hundred(600) and four thousand (4,000).

4. A process for preparing the triblock copolymer of claim 1 comprising the steps of:
   i) mixing succinic acid multi-chained PEO derivatives with lactide or glycolide using tin (II) as catalyst;
   ii) reacting the mixtures for 3 hours at 160°–180° C.;
   iii) washing the reacted mixtures with acetone-water (1:1 V/V), and extracting said reacted and washed mixtures with ethylacetate-normal hexane (2:1 V/V); and then
   iv) drying the mixture for three days in a vacuum oven.

5. A process for preparing a triblock copolymer according to claim 4, wherein the triblock copolymer contains an odd number of multi-chained PEO derivatives prepared by the following steps:
   i) reacting 1 mole of PEO with excess succinic acid in the presence of triethylamine and dimethylaminopyridine (DMAP) as catalyst, in dichloromethane solvent in order to obtain an acid-form PEO derivative;
   ii) adding 2 moles of PEO to said acid-form PEO derivative in order to obtain three-chained PEO derivative; and
   iii) repeating steps i) and ii) above.

6. A process for preparing a triblock copolymer according to claim 4, wherein the triblock copolymer contains an even number of multi-chained PEO derivatives prepared by the following steps:
   i) reacting 1 mole of PEO with 0.5 mole of succinic acid in the presence of triethylamine and dimethylaminopyridine (DMAP) as catalyst, in dichloromethane solvent in order to obtain double-chained PEO derivative;
   ii) reacting said double-chained PEO derivative with excess succinic acid in the presence of triethylamine and dimethylaminopyridine (DMAP) as catalyst, in dichloromethane solvent in order to obtain an acid-form double-chained PEO derivative;
   iii) adding 2 moles of PEO to said acid-form double-chained PEO derivative in order to obtain four-chained PEO derivative; and
   iv) repeating steps ii) and iii) above.

* * * * *

UNITED STATES PATENT AND TRADEMARK OFFICE
CERTIFICATE OF CORRECTION

PATENT NO.   : 5,476,909
DATED        : February 7, 1994
INVENTOR(S)  : Gun P. Kim, et al.

It is certified that error appears in the above-identified patent and that said Letters Patent is hereby corrected as shown below:

| Column | Line | |
|---|---|---|
| 3 | 49 | Change "Four(4) chained" to --Four-chained--. |
| 4 | 23 | Change "10° C." to --10° C./min.--. |

Signed and Sealed this

Fourth Day of June, 1996

Attest:

BRUCE LEHMAN

Attesting Officer     Commissioner of Patents and Trademarks